United States Patent [19]
Kanayama et al.

[11] 3,782,819
[45] Jan. 1, 1974

[54] MICROFILM DRIVING DEVICE FOR MICROFICHE CAMERA

[75] Inventors: Mitsutoshi Kanayama; Takako Toda, both of Tokyo, Japan

[73] Assignee: Canon Kabushiki Kaisha, Tokyo, Japan

[22] Filed: Mar. 7, 1973

[21] Appl. No.: 338,856

[30] Foreign Application Priority Data
Mar. 10, 1972   Japan.............................. 47/24499

[52] U.S. Cl. ............................................. 355/54
[51] Int. Cl. .....:..................................... G03b 27/44
[58] Field of Search........................... 355/53, 54, 86

[56] References Cited
UNITED STATES PATENTS
3,627,413  12/1971  Bushey et al. ........................ 355/53
3,672,769   6/1972  Ross..................................... 355/54

Primary Examiner—Samuel S. Matthews
Assistant Examiner—Michael L. Gellner
Attorney—William R. Woodward et al.

[57] ABSTRACT

A film driving device for microfiche camera employs stepping motors for driving a microfilm and a microfilm carrier. Each of the stepping motors is numerically controlled by a variable pulse oscillator. The variable pulse oscillator comprises an oscillator circuit and a time constant circuit for changing a oscillation frequency of the oscillator circuit. The oscillator circuit adapts to rapidly increase the frequency of the clock pulses to be applied to the stepping motors in response to the variation in the time constant of the time constant circuit to vary the feeding speeds of the microfilm and the microfilm carrier.

3 Claims, 11 Drawing Figures

PATENTED JAN 1 1974 3,782,819

MICROFILM DRIVING DEVICE FOR MICROFICHE CAMERA

BACKGROUND OF THE INVENTION

1. Field of the Invention

The present invention relates to a driving device for a microfiche camera and more particularly a microfilm driving device especially adapted to cause a stepping motor to rotate at a high speed in response to the modulated numerically controlled pulses.

2. Description of the Prior Art

In the conventional microfiche cameras, the driving or transport of the microfilm in the X direction, that is in the direction in which the rolled microfilm is transported from a supply reel or magazine to a take-up reel or magazine or vice versa is controlled by a stepping motor whereas the displacement of the microfilm in the Y direction, that is in the direction perpendicular to the X direction is controlled by a servomotor or the like in an analog manner. Therefore only one microfiche format may be used when the images are recorded or photographed upon the microfilm, and the change of the microfiche format cannot be made by a simple manner for example by selecting a switch or the like. Furthermore there is a problem that the stepping motor used in a conventional microfiche camera is generally driven at a low self-starting speed with a low frequency.

SUMMARY OF THE INVENTION

One of the objects of the present invention is therefore to provide an improved microfilm driving device for a microfiche camera which may overcome the above and other problems encountered in the prior art microfilm driving devices.

Another object of the present invention is to provide a microfilm driving device for a microfiche camera of the type in which the microfilm is moved both in the X and Y directions by stepping motors so that the data images may be recorded in predetermined positions with a higher degree of accuracy.

Another object of the present invention is to provide a microfilm driving device for a microfiche camera of the type in which the rotational speed of the stepping motors is continuously increased from a low speed to a high speed in response to variable-frequency clock pulses so that the stepping motors may be driven at a high average speed.

According to the present invention a microfilm having a relatively large width is held flat in an exposure stage in a microfiche camera and is displaced in both X and Y directions by stepping motors which in turn are controlled by a variable pulse oscillator of the type having a frequency control means. Therefore the stepping motors may be driven at a high speed immediately after they are started.

The above and other objects, features and the advantages of the present invention will become apparent from the following description of the preferred embodiment thereof taken in conjunction with the accompanying drawing.

DESCRIPTION OF THE PREFERRED EMBODIMENTS

Figure 1A:
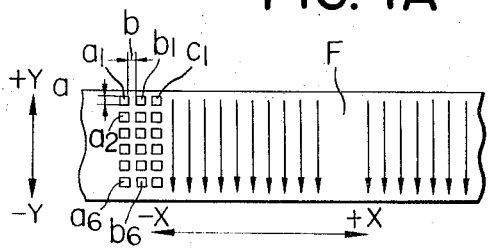
FIGS. 1(A) and (B) are schematic views of a microfilm used for the explanation of the sequence of recording or photographing the images.
Figure 1B:
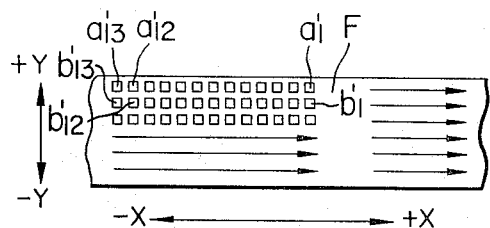

In order to record the images upon a microfische, images $a1$, $a2$, ..... and $a6$ are sequentially recorded or photographed in the $-Y$ direction as shown in FIG. 1(A), and then the film F is displaced in the $+X$ direction by a distance $b$ equal to the width of each image or frame so that the images in the next column may be sequentially recorded or photographed in the $-Y$ direction again. Alternatively as shown in FIG. 1(B) the film F is intermittently displaced in the $+X$ direction by a distance $b$ so as to record the images $a'$, $a'2$, ....... and $a'13$, and thereafter the film F is fed back to the $-X$ direction and then displaced in the $-Y$ direction by a distance equal to the spacing between the adjacent images so that the images $b'1 - b'13$ may be recorded in a similar manner to that described above. For carrying out the microfiche recording or photographing a projection lens system is generally held stationary whereas the film F is transported from a supply reel to a take-up reel in the X direction and is also displaced in the Y direction by a film carrier which serves to hold the film is flat position when the image is recorded.

Figure 2:
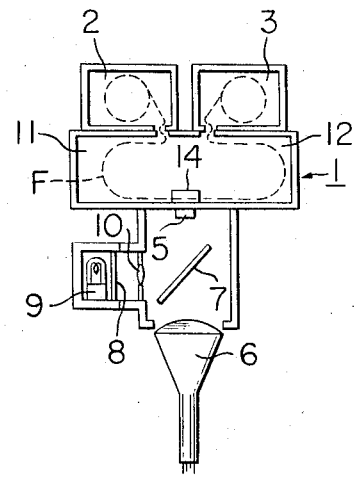
FIG. 2 is a schematic sectional view of a microfiche camera to which is applied the present invention.

Next referring to FIG. 2 illustrating a computer output microfilming device to which is applied a microfische camera in accordance with the present invention, reference numeral 1 denotes a camera proper; 2, a supply magazine from which the microfilm F is supplied; 3, a take-up magazine; 4, an exposure stage; 5, a projection lens; 6, a cathode-ray tube for sequentially displaying the output of an electronic computer; 7, a half miller; 8, a format slide for recording a specified format upon the microfilm F together with the output of the computer; 9, a light source; and 10, a projection lens.

The output of the computer displayed upon the faceplate of the cathode-ray tube 6 is projected through the projection lens system 5 and recorded upon the microfilm F as the film carrier in the exposure stage 4 is intermittently displaced in the direction of the width of the microfilm F, that is in the Y-direction in FIG. 1(A) so that the microfiche as shown in FIG. 1(A) may be obtained.

The microfilm F which is supplied from the supply magazine 2 is looped in a loop box 11 between the supply magazine 2 and the exposure stage 4 and is fed into the latter. The microfilm F which has been exposed in the exposure stage 4 is also looped in the loop box 12 before it is taken up by the take-up magazine 3.

Figure 3:
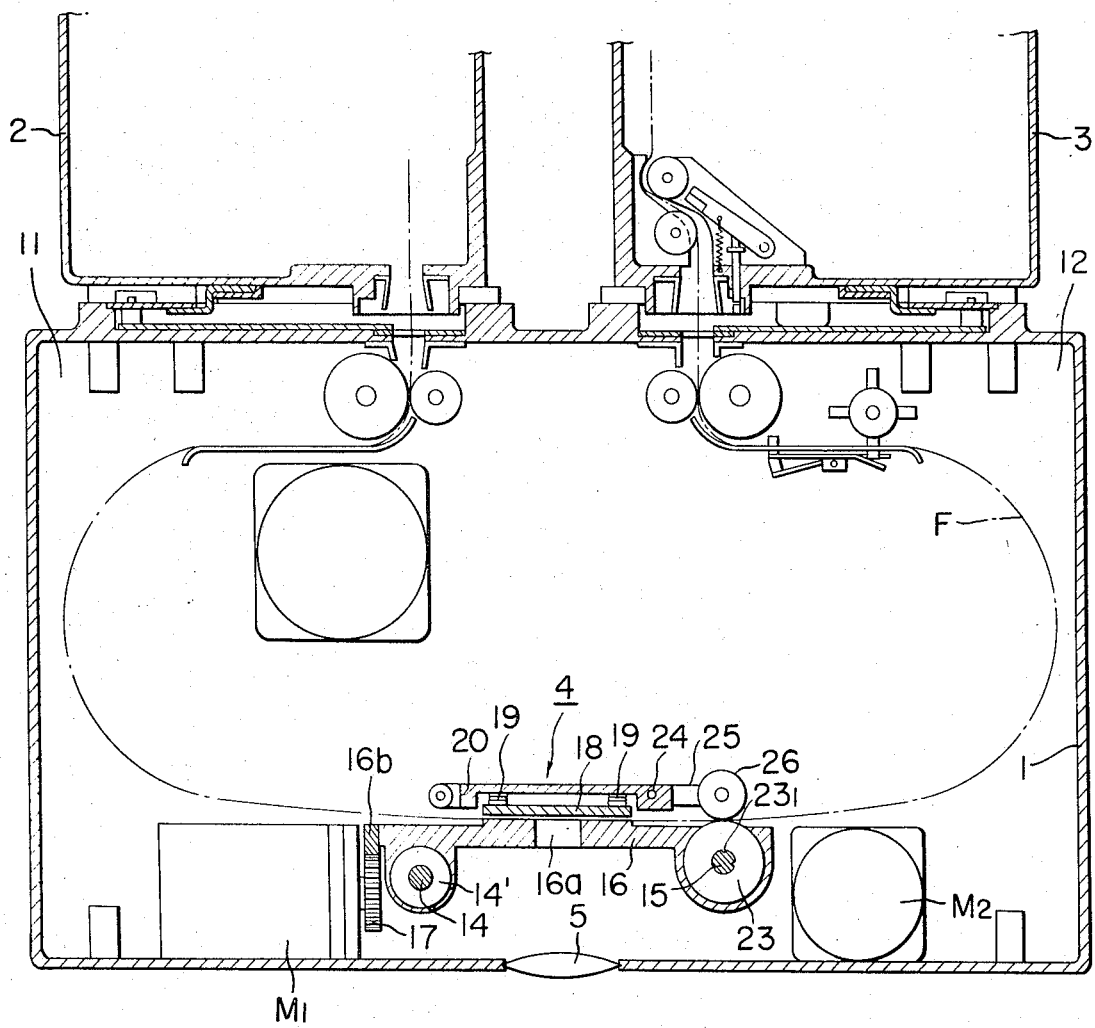
FIG. 3 is a fragmentary sectional view thereof on enlarged scale illustrating especially a microfilm carrier and its associated component parts.
Figure 4:
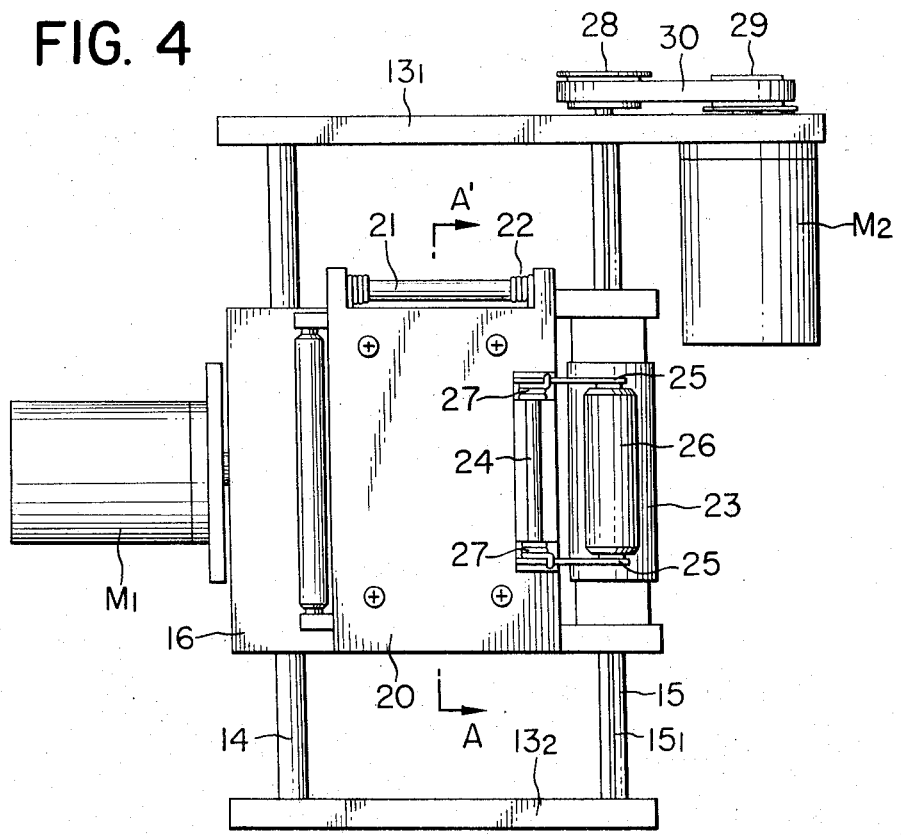
FIG. 4 is a top view, on enlarged scale, of the microfilm carrier of the microfiche camera shown in FIG. 2.
Figure 5:
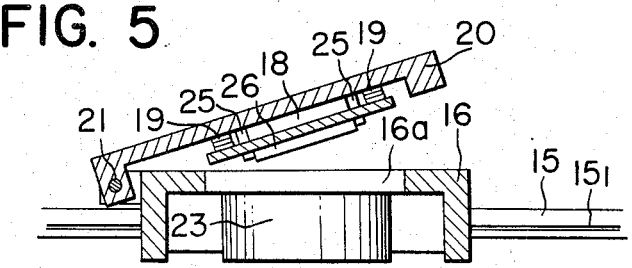
FIG. 5 is a sectional view taken along the line A-A' of FIG. 4.

The exposure stage 4 of the microfische camera 1 is illustrated in detail in FIGS. 3, 4 and 5. First referring to FIG. 4 a guide rod 14 is securely supported by a pair of side walls $13_1$ and $13_2$ of the camera proper 1, and a spline shaft 15 having a spline groove $15_1$ is also rotatably supported by the side walls $13_1$ and $13_2$. A microfilm carrier 16 which is slidably fitted over the guide rod 14 has a slit 16a (See FIGS. 3 and 5) formed therethrough at the center thereof, the slit 16a having a width equal to that of an image or frame to be recorded on the microfilm F. The microfilm carrier 16 is also provided with a rack 16b (See FIG. 3) extending along one side edge thereof in parallel with the guide rod 14 and being in mesh with a gear 17 carried by the driving shaft of a stepping motor M1 (See also FIG. 3). A pressure plate 18 for holding the microfilm F in flat position is supported through springs 19 upon a pressure plate holder 20.

The pressure plate holder 20 is pivoted to the carrier 16 with a pivot pin 21 as shown in FIGS. 4 and 5, and is normally biased under the force of a spring 22 to move away from the carrier 16. The microfilm F is placed between the carrier 16 and the pressure plate 18 and the pressure plate holder 20 is pressed downwardly against the spring 22 so that it may engage with the carrier 16. As best shown in FIG. 3 at the forward end of the carrier 16 is provided a capstan roller 23 rotatably carried by a hollow shaft having a projection $23_1$ in engagement with the groove $15_1$ so that the capstan 23 may be slidable along the spline shaft 15 in the transverse direction that is Y-direction of the microfilm F.

A pinch roller 26 is rotatably supported by a pair of parallel arms 25 pivoted to a shaft 24 extending transversely in a notch formed in the pressure plate holder 20, and is normally pressed against the capstan roller 23 under the force of a spring 27 loaded between the shaft 24 and the pair of parallel arms 25.

The spline shaft 15 is driven by a stepping motor M2. That is, a belt 30 is wrapped around a pulley carried by the spline shaft 15 and a pulley carried by the driving shaft of the stepping motor M2. When the spline shaft 15 is driven, the capstan roller 23 carried thereby is also driven. As described hereinbefore the carrier 16 is displaced transversely by the stepping motor M1. Since no flexible member such as wire is interposed between the stepping motors M1 and M2 and the driven members, that is the carrier 16 and the capstan roller 23, both the carrier 16 and the capstan roller 23 may be stopped immediately when the stepping motors are stopped.

The microfilm F is held flat between the carrier 16 and the pressure plate 18 and is also pressed against the capstan roller 23 by the pinch roller 26. The carrier 16 is displaced transversely of the microfilm F, that is in the ±Y directions along the guide rod 14 and the spline shaft 15 by the stepping motor M1 so that the microfilm F held between the carrier 16 and the pressure plate 18 may be displaced transversely in unison with the capstan and pinch rollers 23 and 26 by a predetermined distance whenever the pulse signal is applied to the stepping motor M1 from a control circuit (not shown) as the image to be recorded is displayed on the faceplate of the cathode-ray tube 6. When a predetermined number of images a1 – a6 are recorded transversely upon the microfilm F, the carrier 16 is returned to its initial position. Then the driving pulse is applied from the control circuit (not shown) to the stepping motor M2 so that the capstan roller 23 is rotated to transport the microfilm F in the X direction by a distance b. Next the images are recorded transversely on the microfilm F in the next column in the manner described above.

Figure 6:
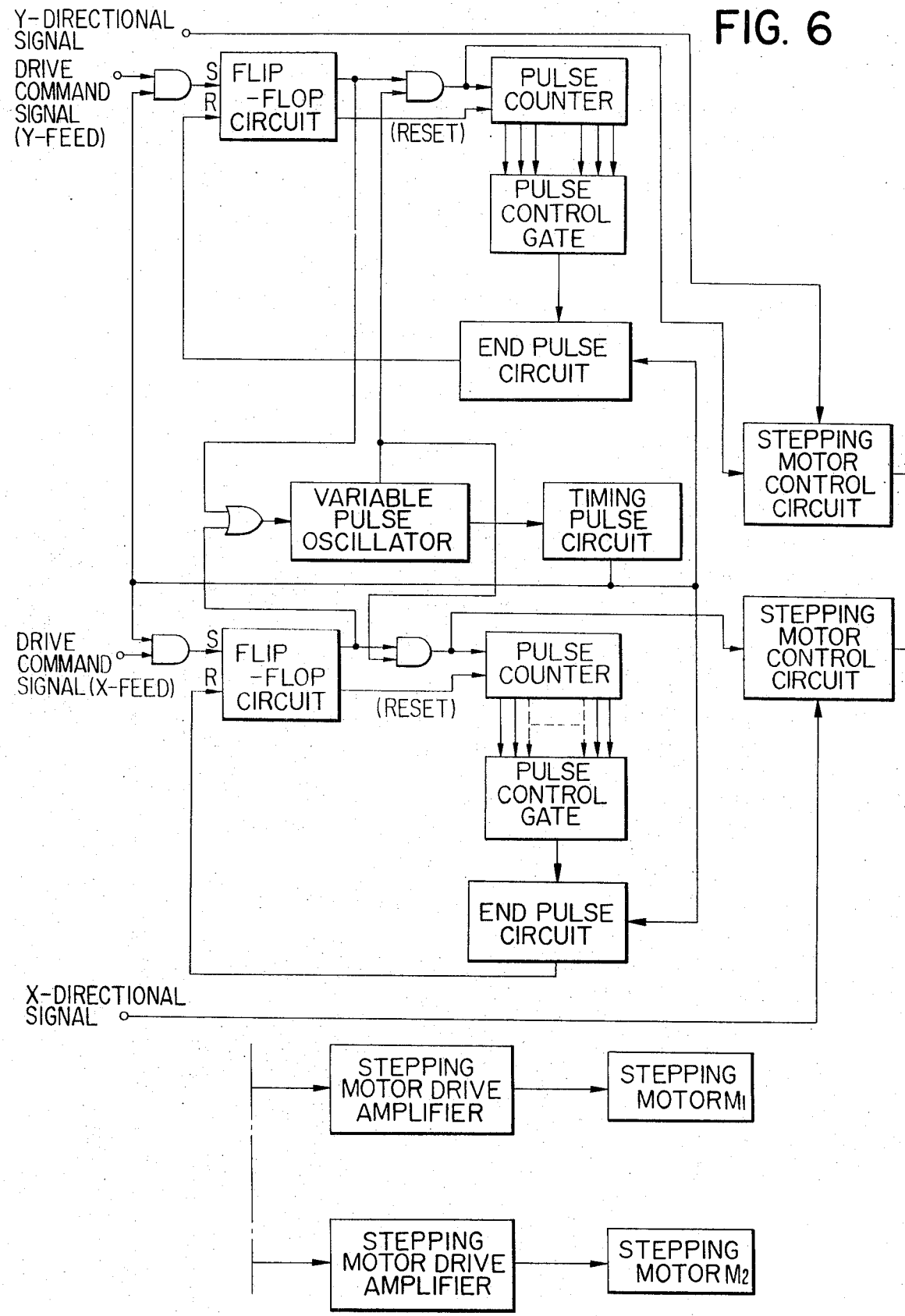
FIG. 6 is a block diagram of a control device for controlling stepping motors used for driving the microfilm.
Figure 7:
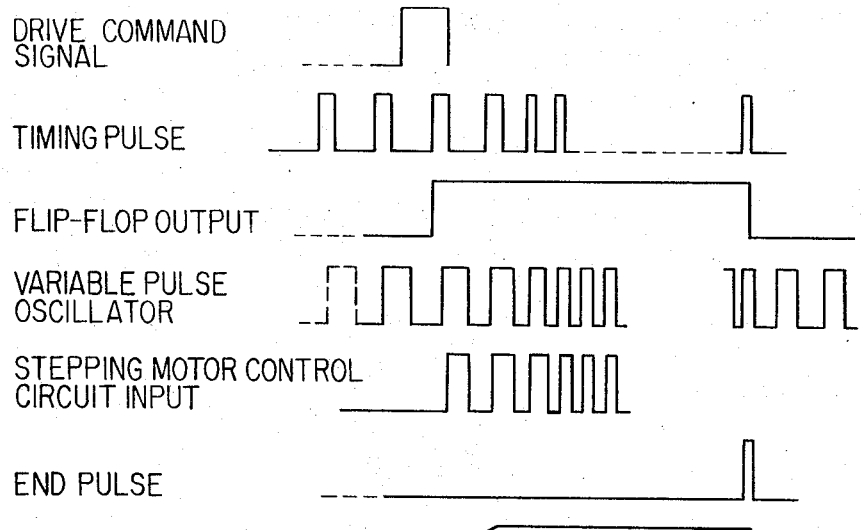
FIG. 7 is a timing chart used for the explanation of the mode of operation thereof.

The control circuit for controlling the stepping motors M1 and M2 is shown in block diagram in FIG. 6. Since the mode of operations of the stepping motors M1 and M2 for stepping the microfilm F in the X and Y directions are substantially similar, only the mode of operation for controlling the stepping motor M1 for stepping the microfilm in the Y direction, that is transversely of the microfilm F will be described hereinafter. When the drive command signal which is applied to a Y-feed input terminal is fed to a gate together with a timing pulse, a flip-flop is set, and in response to the set output signal a gate to a pulse counter is opened so that the clock pulses of a low frequency are fed from a variable pulse oscillator to a pulse counter. The clock pulses are also fed into a stepping motor control circuit for accomplishing the logic functions required for controlling the stepping motor. The output of the stepping motor control circuit is amplified by an amplifier so as to energize the windings of the stepping motor M1.

The set output of the flip-flop is also applied to a gate to the variable pulse oscillator so that the frequency of the clock pulse is gradually increased as will be described in more detail hereinafter because the increase in frequency of the clock pulse in response to the set output is one of the important features of the present invention.

When a predetermined number of pulses are counted by the pulse counter, an end pulse is generated in synchronism with the timing pulse from end pulse generating means and is applied to the flip-flop so that the latter is reset. Simultaneously the pulse counter is also reset and the oscillation frequency of the variable pulse oscillator returns to and remains at its initial low frequency until the next drive command signal is received.

Next referring to FIGS. 8, 9 and 10 the control of the oscillation frequency of the variable pulse oscillator will be described in detail hereinafter.

In general the frequency at which the self-starting of the stepping motor is initiated is lower than the frequency at which the stepping motor is continuously driven so that it takes some time before the stepping motor can rotate at a high speed after it has been started. This tendency of the stepping motor brings about a problem when the rotation of the stepping motor with a higher degree of accuracy is utilized to the full extent. The present invention was made in order to overcome the above problem and has its object to provide a driving circuit for permitting a stepping motor to rotate at a high speed immediately after it is started. According to the present invention a stepping motor driving circuit comprises a variable pulse oscillator of the type in which the oscillation frequency may be rapidly and continuously increased in response to an input signal with a predetermined level so that it may reach a high oscillation frequency within a very short time. Therefore the stepping motor may be driven at a predetermined high rotational speed immediately after it is started so that the control with a higher degree of accuracy may be accomplished.

Figure 8:
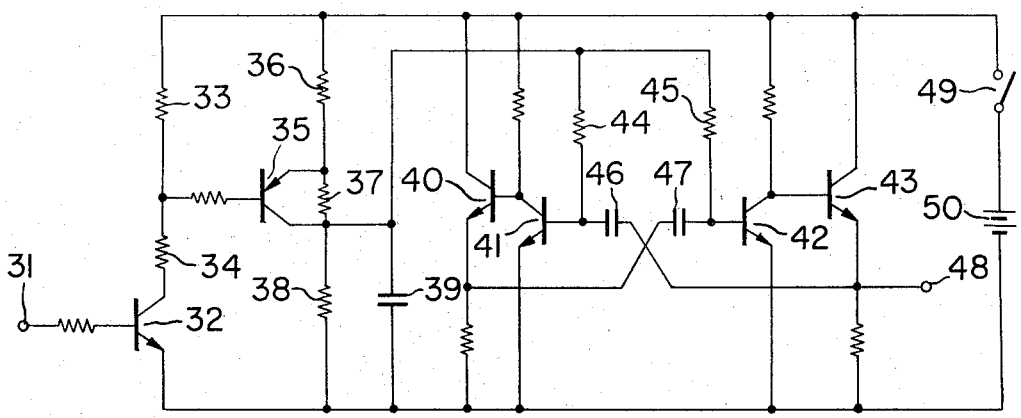
FIG. 8 is a circuit diagram of a variable pulse oscillator in accordance with present invention.

Now referring to FIG. 8 illustrating one embodiment of a variable pulse oscillator in accordance with the present invention, a signal with a predetermined level is applied to a control signal input terminal 31 which is connected through a resistor to the base of an emittergrounded transistor 32 which functions as a switching transistor which is closed in response to the control signal. Two resistors 33 and 34 are inserted into the collector circuit of the transistor 32 so that a transistor 35 may function as a switching transistor which is closed in response to the voltage divided by the resistors 33 and 34 and applied through a resistor to its base. Resistors 36, 37 and 38 are inserted into the output circuit of the switching transistor 35, constituting a voltage divider in which the resistor 37 is de-energized or short-circuited in response to the switching action of the transistor 35. A capacitor 39 is inserted in order to form a time constant circuit. Transistors 40, 41, 42 and 43 constitute an astable multivibrator, and the voltage across the capacitor 39 is applied to the bases of the transistors 41 and 42 through resistors 44 and 45 respectively. Capacitors 46 and 47 are inserted into the base circuits of the transistors 41 and 42, and an output terminal 48 is connected to the stepping motor driving circuit (not shown). The variable pulse oscillator further comprises a DC power source 50 and an on-off switch 49.

Figure 9:
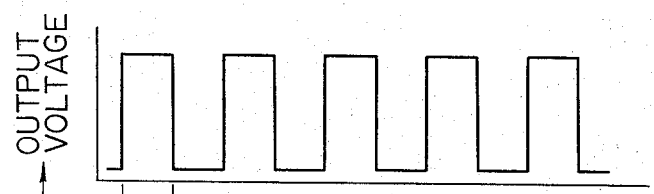
FIGS. 9 and 10 show waveforms of the output signals thereof used for the explanation of the mode of operation thereof.
Figure 10:
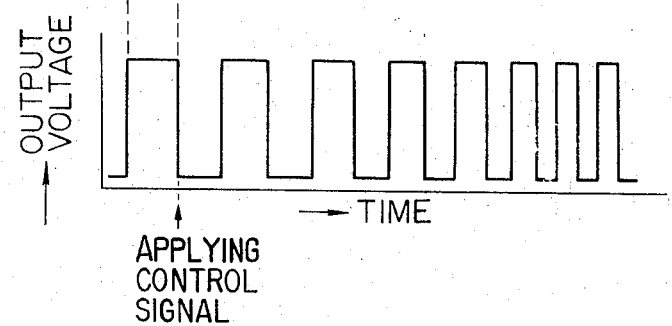

Next the mode of operation will be described with further reference to FIG. 9 illustrating the output waveform when the control signal is not applied and FIG. 10 illustrating the waveforms when the control signal is applied. when the on-off switch 49 is closed and no control signal is applied to the input terminal 31, the transistor 32 is cut off, and so is the transistor 35. The capacitor 39 is charged through the resistor 36 and 37 and the voltage across the capacitor 39 equals at a certain time the voltage across the resistor 38. Then the base voltage is applied to the bases of the transistors 41 and 42 in the astable multivibrator so that the latter starts to oscillate at a predetermined frequency. Assume that the resistances of the resistors 44 and 45 are equal to $Rb$ and both the capacitors 46 and 47 are equal to $Cb$. Then the transistors 41 and 42 have the same cut-off time, $tf$ which is given by $$tf = Rb \cdot Cb \cdot Ln\ [\ 1 + (Vc/Eb)\ ] \quad (1)$$

where
 $Eb$ = base potential applied to the bases of the transistors 41 and 42, and
 $Vc$ = power source voltage.

Therefore the variable pulse oscillator oscillates at a predetermined frequency so that the rectangular waveforms with a predetermined interval or period $tf$ may be generated.

When the control signal is applied to the input terminal 31 both transistor 32 and 35 are conducted so that the resistor 37 is short-circuited by the transistor 35. Therefore the capacitor 39 is charged only through the resistor 36 so that the charging time is dependent upon a time constant determined by the resistor 36 and the capacitor 39. The off time $tf'$ of the transistors 41 and 42 is given by $$tf' = Rb \cdot Cb \cdot Ln\ [\ 1 + (Vc/Eb')\ ] \quad (2)$$

where $Eb'$ = voltage across the capacitor 39. When the control signal is applied to the input terminal 31 the base potential at the bases of the transistors 41 and 42 is exponentially increased to the saturation voltage across the capacitor 39 so that the oscillation frequency is continuously increased as shown in FIG. 10. The oscillation frequency reaches a predetermined frequency when the voltage applied to the bases of the transistors 41 and 42 reaches $Eb'$.

Therefore the stepping motor may be started at a high speed when the control signal with a predetermined level is applied to the input terminal 31 immediately before or when the stepping motor is started. As described hereinbefore the oscillation frequency of the variable pulse oscillator may be continuously increased by the selection of the suitable capacitor 39 and the charging resistors 36 and 37 so that the high speed starting of the stepping motor may be attained immediately in response to the drive command signal.

When the driving circuit in accordance with the present invention is incorporated into a microfische camera the following advantages may be obtained:

i. The numerical control of the microfilm or film carrier by the stepping motors may be accomplished.

ii. The stepping motors may be controlled by the clock pulses whose frequency is increased from a low frequency to a high frequency by the variable pulse oscillator so that the stepping motors may attain a high speed very rapidly.

iii. Since the stepping motors are controlled by the variable-frequency clock pulses, the starting of the microfilm or microfilm carrier is very smooth with the minimum noise.

iv. Since the stepping motor is not mounted on the carrier the latter may be made light in weight so that the high-speed movement of the microfilm carrier may be further facilitated. More particularly the displacement in the Y direction of the microfilm carrier is made through the rack and pinion by the stepping motor whereas the displacement in the X direction is made by the stepping motor whose rotation is transmitted to the spline shaft whose rotation in turn is transmitted to the capstan roller.

v. Since the power of the stepping motor is directly transmitted to the carrier through the rack and pinion and no flexible member is interposed therebetween, the oscillations of the carrier may be minimized when it is stopped so that the high-speed image recording may be facilitated.

We claim:

1. A film driving device for a microfiche camera comprising
 a. stepping motors for driving a microfilm and a microfilm carrier, respectively, and
 b. a variable pulse oscillator for numerically controlling each of said stepping motors in response to a drive command signal, said variable pulse oscillator comprising
  a switching circuit,
  a time constant circuit adapted to change its time constant in response to the actuation of said switching circuit, and
  an oscillator circuit adapted to rapidly increase the frequency of the clock pulses to a predetermined frequency in response to the variation in the time constant of said time constant circuit.

2. A driving device for a microfiche camera as defined in claim 1 wherein
 said microfilm carrier is provided with a pair of feed rollers for the microfilm,
 one of said pair of feed rollers is slidably fitted over a rotary member having a spline groove, and said rotary member is drivingly coupled to said stepping motor disposed externally and independently of said microfilm carrier.

3. A driving device for a microfiche camera as defined in claim 1 comprising
   a. a flip-flop adapted to be set when a drive commande signal and a timing pulse are simultaneously applied to an AND gate output of which is connected to input of said flip-flop,
   b. variable pulse oscillator means adapted to continuously increase the frequency of the clock pulses generated by said oscillator circuit to a predetermined frequency by decreasing a time constant of said time constant circuit in response to the actuation of said switching circuit which in turn is actuated in response to the set output of said flip-flop,
   c. a pulse counter for counting the output pulses generated by said variable pulse oscillator,
   d. end pulse generating means for generating the end pulse in response to the output of said pulse counter and in synchronism with a timing pulse, thereby resetting said flip-flop,
   e. stepping motor control circuit means for controlling stepping motor in response to the input to said pulse counter, and
   f. timing pulse generating means for generating the timing pulses in response to the output of said variable pulse oscillator means.

* * * * *